United States Patent [19]

Gemmell-Murdoch

[11] Patent Number: 4,569,379
[45] Date of Patent: Feb. 11, 1986

[54] TREE HARVESTER

[75] Inventor: Andrew Gemmell-Murdoch, Gympie, Australia

[73] Assignee: Murdoch Logging Industries Pty. Ltd., Gympie, Australia

[21] Appl. No.: 552,060
[22] PCT Filed: Jan. 21, 1983
[86] PCT No.: PCT/AU83/00010
 § 371 Date: Oct. 25, 1983
 § 102(e) Date: Oct. 25, 1983
[87] PCT Pub. No.: WO83/02540
 PCT Pub. Date: Aug. 4, 1983

[30] Foreign Application Priority Data

Jan. 21, 1982 [AU] Australia ............................... PF2382

[51] Int. Cl.⁴ ..................... A01G 23/08; A01G 23/00
[52] U.S. Cl. .................................. 144/3 D; 144/2 Z; 144/343
[58] Field of Search ..................... 144/2 Z, 3 D, 343

[56] References Cited

U.S. PATENT DOCUMENTS

| 3,833,034 | 9/1974 | Menzel et al. | 144/3 D |
| 3,892,266 | 7/1975 | Puna | 144/3 D |
| 3,896,862 | 7/1975 | Windsor | 144/3 D |
| 3,905,407 | 9/1975 | Guy et al. | 144/3 D |
| 3,915,211 | 10/1975 | Barwise | 144/34 E |
| 4,416,311 | 11/1983 | Gemmell-Murdoch | 144/2 Z |

FOREIGN PATENT DOCUMENTS

| 54928 | 10/1974 | Australia. | |
| 1038729 | 9/1978 | Canada. | |
| 1110525 | 10/1981 | Canada. | |
| 2725978 | 12/1977 | Fed. Rep. of Germany | 144/2 Z |
| 490432 | 2/1976 | U.S.S.R. | 144/3 D |

Primary Examiner—W. D. Bray
Attorney, Agent, or Firm—Schwartz, Jeffery, Schwaab, Mack, Blumenthal & Evans

[57] ABSTRACT

A tree harvester of the type having a grapple assembly, shear assembly and de-limbing assembly where the grapple assembly and the de-limbing assembly are mounted on respective telescopically slidable carriers. Cables connect the de-limbing assembling (or grapple assembly) to the grapple carrier (or de-limbing carrier) to move the de-limbing assembly (or grapple assembly) along its carrier at substantially the same velocity as the relative velocity between the two carriers. The grapple assembly and de-limbing assembly may delimb two tree trunks in a single operation, both tree trunks being severed by the shear assembly into logs of substantially uniform length.

9 Claims, 11 Drawing Figures

TREE HARVESTER

BACKGROUND OF THE INVENTION

1. Field of the Invention

This invention relates to tree harvesters.

2. Description of the Prior Art

My earlier U.S. Pat. No. 4,416,311 discloses a tree harvester which enables two trees to be delimbed simultaneously.

The harvester described in such patent incorporates a main boom on the machine; a secondary boom, supporting the grapple and shear assemblies, telescopically mounted on the main boom; and a delimbing assembly movably mounted on the main boom and operable so that as the secondary boom is extended forwardly, the delimbing head moves rearwardly along the main boom at approximately the same speed.

This harvester has proved to have considerable advantages over previously known machines (examples of which include those described in Canadian Pat. Nos. 1,046,908 and 1,051,756 of Eaton Yale Ltd; U.S. Pat. No. 3,905,407 assigned to Clark Equipment Co.; Australian Pat. No. 496860 of Eaton Yale Ltd.; and Australian Pat. Nos. 474858 and 475520 of R. L. Windsor & Son Pty. Ltd.). However, it is considered that a number of improvements can be made to that harvester.

On that harvester, the secondary boom is extended e.g. 2-4 meters, to enable a length of e.g. 4.8 meters to be delimbed in each delimbing operation. In certain applications it is considered that this forward extension places the weight of the trees too far forward of the centre of gravity of the harvester, unbalancing it.

In another area, it has been found that where the grapples are holding two trees of markedly different diameters, the smaller tree may not be on the bottom knives of the delimbed head, reducing the effectiveness of the latter.

It is also considered that the scissor-type action of the shearing head does not cut the trees as cleanly as possible, especially when docking the trees to length.

In addition, the limited movement of the shear and grapple heads relative to the machine does not enable the harvester to harvest trees which have fallen or are leaning away from the harvester.

Finally, when de-limbing the upper sections of the trees, these sections are often not strong enough to enable the trees to be fed through the shear and grapple heads to enable them to be docked to length and so one length of timber from each tree may be wasted.

SUMMARY OF THE PRESENT INVENTION

It is an object of the present invention to provide a boom assembly for tree harvesters where the secondary boom supporting the grapple assembly does not have to be extended forwardly the same distance as the delimbing assembly moves rearwardly.

It is a preferred object of the present invention to provide a grapple assembly where the grapples are so arranged that the grapples align the centres of both trees in the same plane regardless of their respective diameters, so that both trees will be supported by the base plate of the delimbing head.

In a further preferred embodiment, the shears in the shearing head are fully floating and mounted on parallelogram-type links so that they cut transversely to the axis of the shears.

In a still further preferred embodiment, the shearing and grappler assembly are mounted on a support assembly which enables the assemblies to cut trees which are lying down or inclined longitudinally or laterally relative to the machine.

In a still further preferred embodiment, the grapple assembly is operable to lift delimbed trees and deposit them on a stack.

Other preferred objects of the present invention will become apparent from the following description.

In one aspect the present invention resides in a tree harvester including:

a main boom mounted on a prime mover;

a secondary boom telescopically mounted on the main boom and supporting a grapple assembly for gripping a tree trunk and a shear assembly for severing a tree trunk;

a delimbing gantry movably mounted on the main boom;

a delimbing assembly movably mounted on the delimbing gantry;

means to extend or retract the secondary boom relative to the main boom;

means to move the delimbing gantry relative to the main boom; and means to simultaneously move the delimbing assembly along the delimbing gantry as the delimbing gantry is moved relative to the main boom.

Preferably the means to move the secondary boom and the delimbing gantry include respective hydraulic rams mounted on the main boom. Preferably the means to move the delimbing assembly (having a delimbing head) includes a pair of cables, each fixed at one end to the de-limbing assembly and at the other end to the main boom and passing around respective pulleys at opposite ends of the delimbing gantry.

In a second aspect, the present invention resides in a shear assembly for a tree harvester, including:

a shear support frame;

a pair of shear arms each having a shear blade;

respective pairs of parallelogram links pivotally mounting each shear arm on the support frame; and means interconnecting a respective link on each shear arm adapted to move the shear blades from an opened position to a closed position to sever a tree, the cutting edges of the shear blades being maintained in a substantially parallel relationship.

In a third aspect, the present invention resides in a grapple support assembly for a tree harvester including:

a first support member pivotally mounted on a boom;

a second support member pivotally mounted on the first support member for movement in a plane substantially along the longitudinal axis of the harvester;

a grapple assembly mounted on the second support member; and means interconnecting the first and second support members and operable to move the second support member to enable the grapple assembly to engage and grip trees between a substantially vertical and a substantially horizontal attitude.

Preferably the first support member is pivotally mounted on the boom for pivotal movement in the same plane as the second support member.

Preferably the first and second support members are operable to lift delimbed trees from the delimbing assembly and deposit them on a stack.

Preferably the grapple assembly has inner and outer grapple arms to selectively grapple the first and second trees, respectively, to be harvested.

Preferably the inner and outer grapple arms each have a grapple arm pivotally mounted about a common pivot point which form a common apex ensuring the trees are aligned in the grapple assembly.

Preferably one of each grapple arm pair is bifurcated and co-operates with the other arm of the pair to engage the respective tree at three points to securely grip the tree.

BRIEF DESCRIPTION OF THE DRAWINGS

To enable the invention to be fully understood, a preferred embodiment will now be described, by way of illustrative example only, with reference to the accompanying drawings, in which.

DETAILED DESCRIPTION OF THE PREFERRED EMBODIMENT

Figure 1:
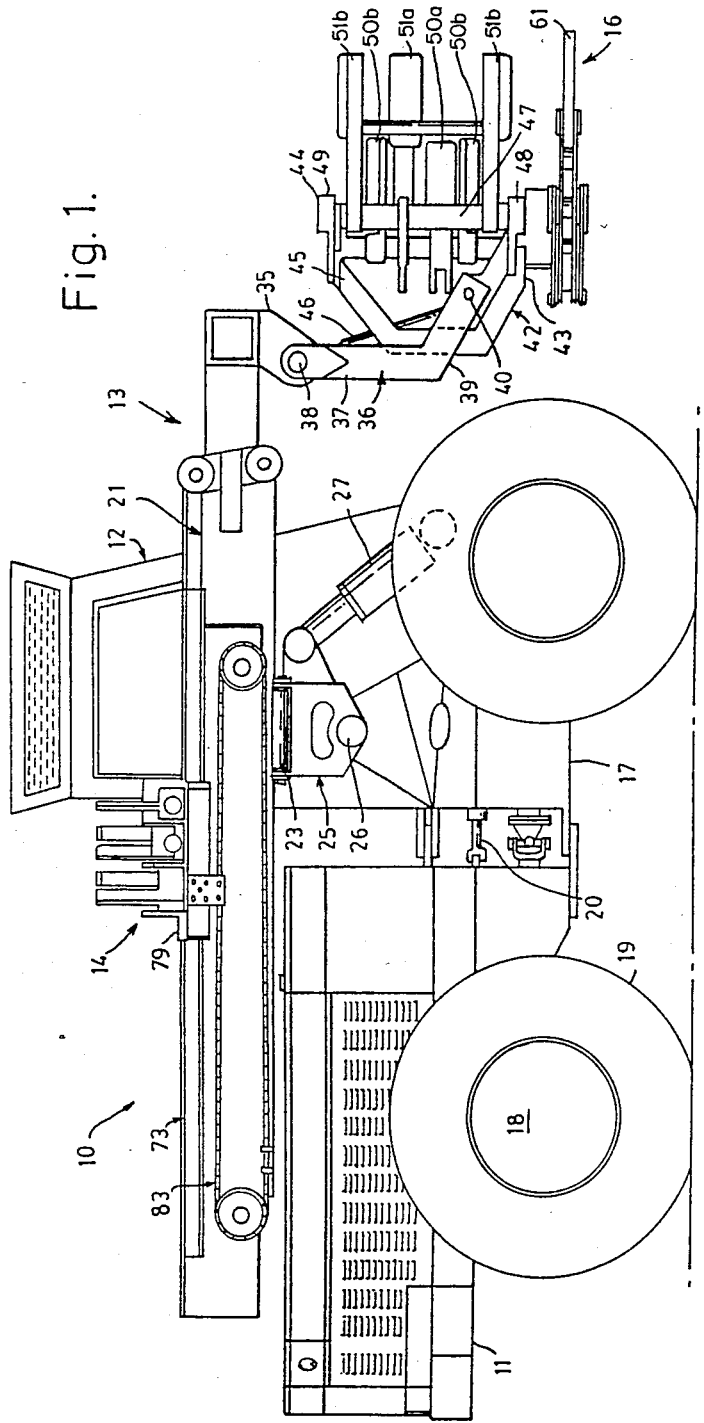
FIG. 1 is a side view of the tree harvester with the grapple and shear assemblies in their tree severing position.

The tree harvester has an articulated prime mover 10. The power unit in the rear section 11 of the harvester contains the engine and hydraulic pumps which power the harvester, while the operator's cabin 12, the boom assembly 13, delimbing assembly 14, and grapple and shear assemblies 15 and 16, respectively, are mounted on the front section 17.

The hubs 18 of the ground wheels 19 are provided with hydrostatic motors (not shown) and the articulated steering is provided by hydraulic rams 20. The boom assembly 13 includes a main boom 21, of substantially box section, mounted on transverse brackets 22 pivotally mounted on a longitudinal pin 23 fixed in the end plates 24 of a support box 25, this box being pivotally mounted on the front section 17 via transverse trunnions 26. Rams 27 (interconnecting the support box and the front section) and 28 (interconnecting the support box and the transverse brackets) are operable to respectively raise and lower, or tilt, the boom assembly 13 relative to the harvester 10.

Figure 6:
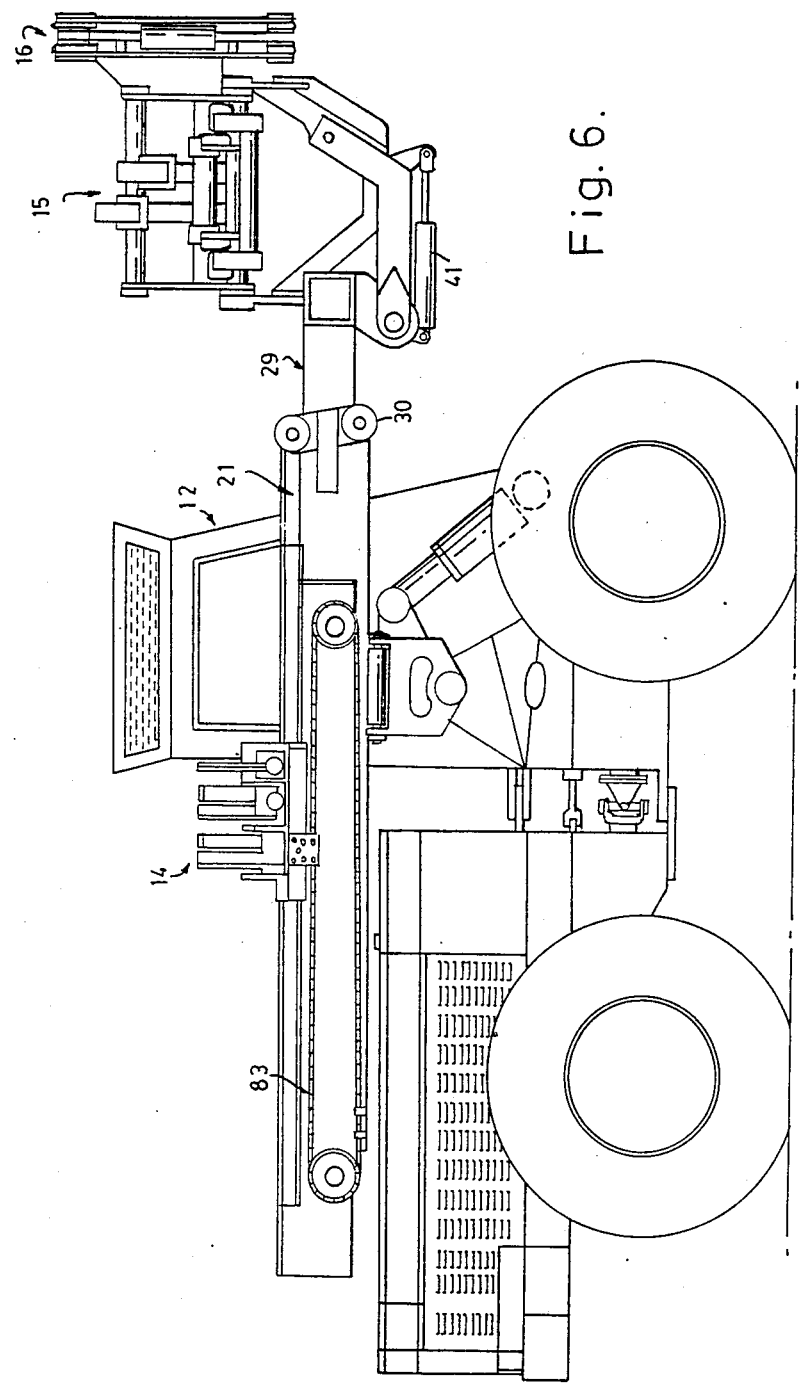
FIG. 6 is a side view of the harvester showing the grapple and shear assemblies raised to their delimbing position during the delimbing operation.

A secondary boom 29, also of box section, is telescopically mounted in the main boom 21 and is provided with and supported by spaced support rollers 30 (FIG. 6) provided at the front of the main boom 21 and by upper and lower rollers 31 (FIG. 8) at the rear end of the secondary boom.

A hydraulic ram 32 is fixed in the secondary boom 29 and engages a flange 33 in the main boom 21, operation of the ram extending and retracting the secondary boom.

A transverse beam 34 is fixed on the forward end of the secondary boom and extends laterally of the front of the harvester. A support block 35 is mounted centrally on the boom.

The support assembly for the grapple and shear assemblies 15, 16 includes an outer support member 36 (FIG. 7) which is substantially L-shape in side view. The support member has a pair of parallel vertical side plates 37 which are pivotally interconnected at their upper ends to the support block 35 via a pivot pin 38. A leg member 39 extends forwardly of the lower end of each side plate 37 and the leg members are interconnected by a transverse pivot pin 40 at their free ends.

A hydraulic ram 41 (see FIG. 6) interconnects the support block 35 and the outer support member 36 and is operable, by retraction or extension, to raise or lower the support member.

The inner support member 42 is substantially C-shape in side view and has a lower leg 43 pivotally mounted on the pivot pin 40 adjacent its forward end. The upper leg 44 is connected to the lower leg 43 by a curved spine 45. A hydraulic ram 46 is mounted to and between the curved spine 45 and the outer support member 36, extension of the ram 46 moving the inner support member 42 to the inclined position shown in FIG. 7, while retraction of the ram moves the inner support member to a substantially upright position (as shown in FIG. 1).

A main pivot and support pin 47 interconnects the free ends of the lower leg 43 and the upper leg 44.

Figure 2:
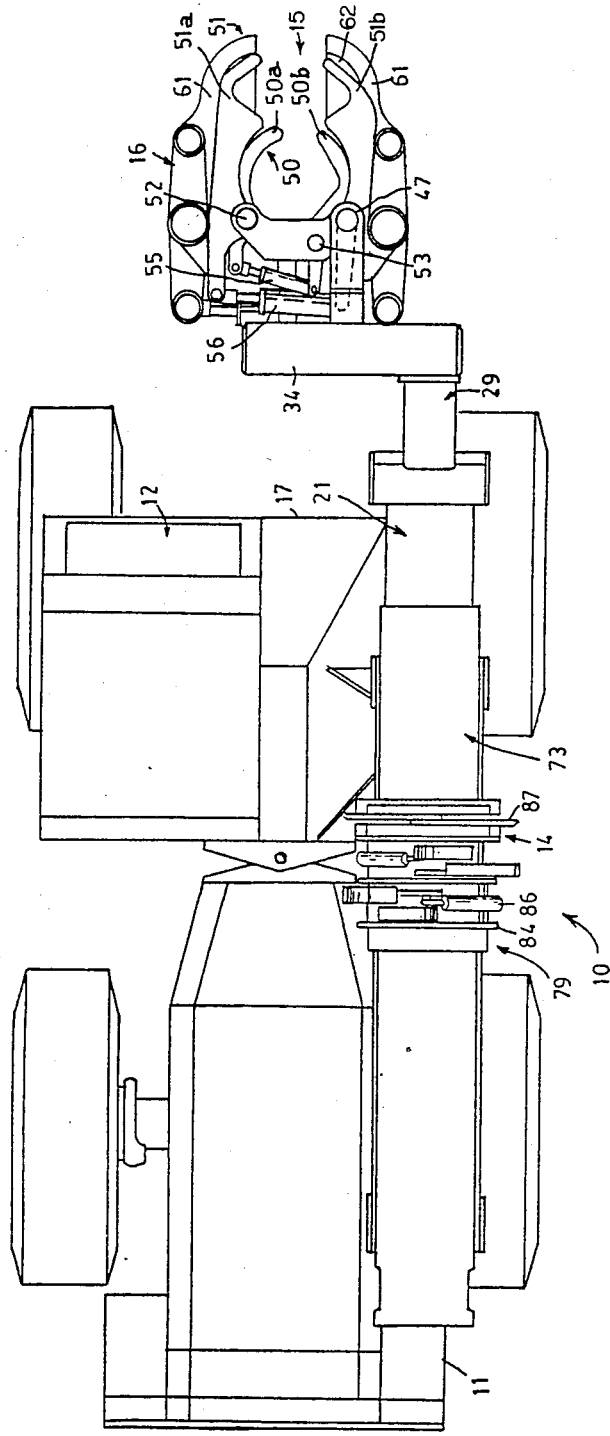
FIG. 2 is a plan view corresponding to FIG. 1.
Figure 5:
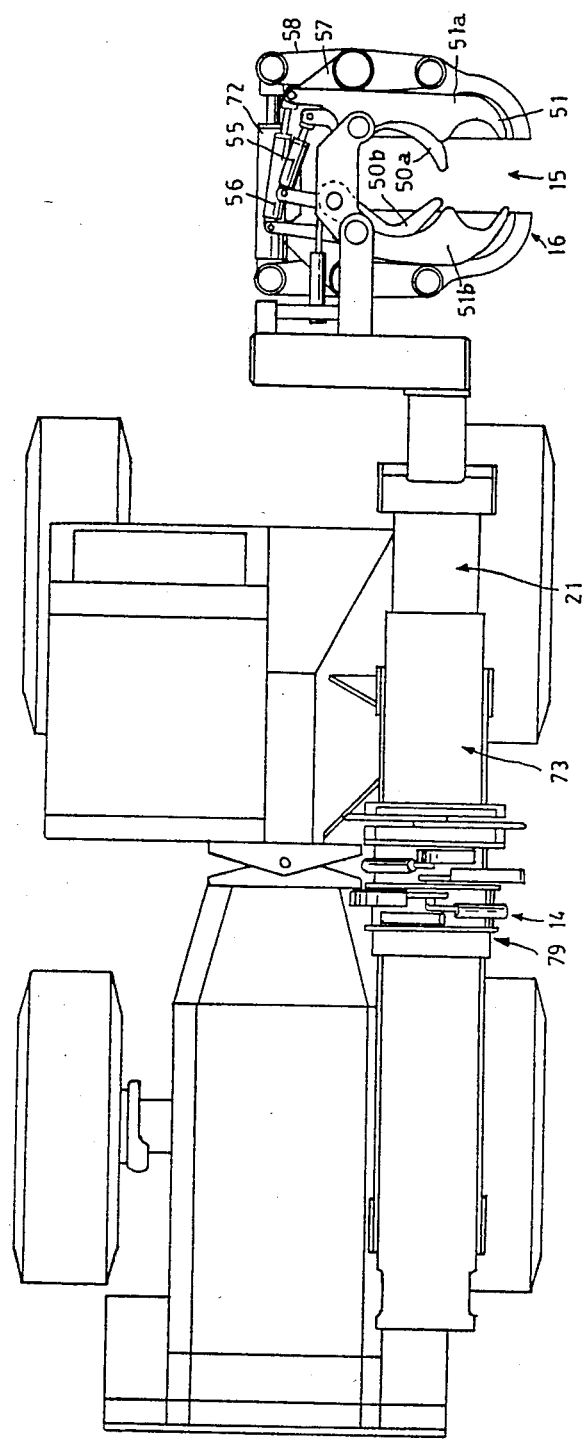
FIG. 5 is a plan view of the tree harvester showing the grapple and shear assembles turned to one side intermediate their tree severing and their delimbing position.

Referring now to FIGS. 2 and 5, in addition to FIG. 1, the grapple assembly 15 has a bottom support plate 48 and a top support plate 49, the support pin 47 extending through both plates.

The grapple assembly has two spaced pairs of inner grapple arms shown at 50 and two spaced pairs of grapple arms shown at 51, the inner and outer grapple arms respectively gripping the first and second trees harvested.

One of the inner grapple arms 50a is mounted on a pivot pin 52 provided between the bottom and top support plates 48, 49. The other grapple arm 50b of the pair is pivotally mounted on a similar pivot pin 53. However, this arm is bifurcated (FIG. 1) so that the first tree is gripped at three points between the pair of arms 50a, 50b. Extensions 54 on the arms are interconnected by a hydraulic ram 55 which is extended to cause the tree to be gripped by the arms. One outer grapple arm 51a is also mounted on pivot pin 52 while the other arm 51b, which is also bifurcated, is mounted on the support pin 47 (FIG. 1). Extensions on the arms are interconnected by a hydraulic ram 56 which is extended to cause the second tree to be harvested to be gripped by these arms.

The centres of the trees gripped in the grapple assembly 15 are aligned as the centres of the trees and the respective pivot points of the inner and outer grapple arms form respective triangles which has a common apex on pivot pin 52.

Figure 3:
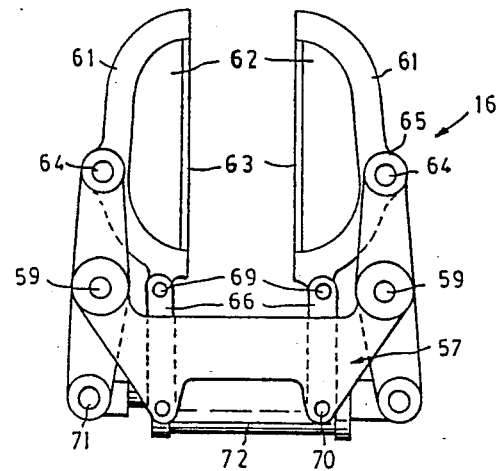
FIG. 3 is a plan view of the shear assembly in its open position.
Figure 4:
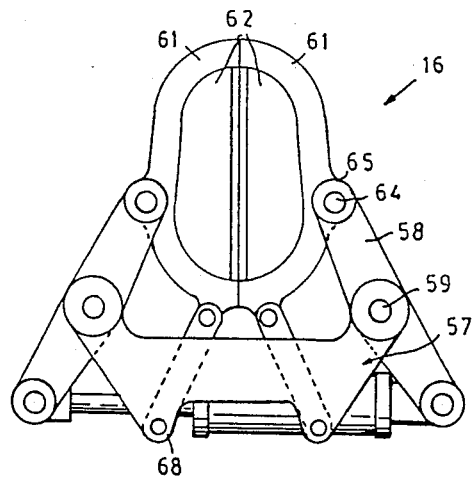
FIG. 4 is a plan view of the shear assembly in its closed position.

The shear assembly 16 (see FIGS. 3 and 4) has top and bottom support yokes 57 pivotally mounted on the main pivot and support pin 47. A pair of rocker links 58 are pivotally mounted intermediate their lengths on pivot pins 59 fixed at the forward free ends of the arms 60 of the support yokes 57.

Each shear arm 61 has a replaceable shear blade 62 with a linear cutting edge 63. Each shear arm is pivotally mounted on the forward end of a respective rocker link 58 via pivot pin 64 which passes through a central lug 65 on the shear arm.

Secondary links 66 pivotally interconnect rearward lugs 67 on each shear arm to corresponding lugs 68 on the yokes 57 via pivot pins 69, 70. As shown, the pivot pins 59, 64, 69, 70 for each shear arm are arranged at the corners of a parallelogram.

When the hydraulic ram 72 interconnecting the rearward free ends of the rocker links 58 is extended, the shear arms 61 are moved towards each other with their cutting edges 63 parallel.

Figure 8:
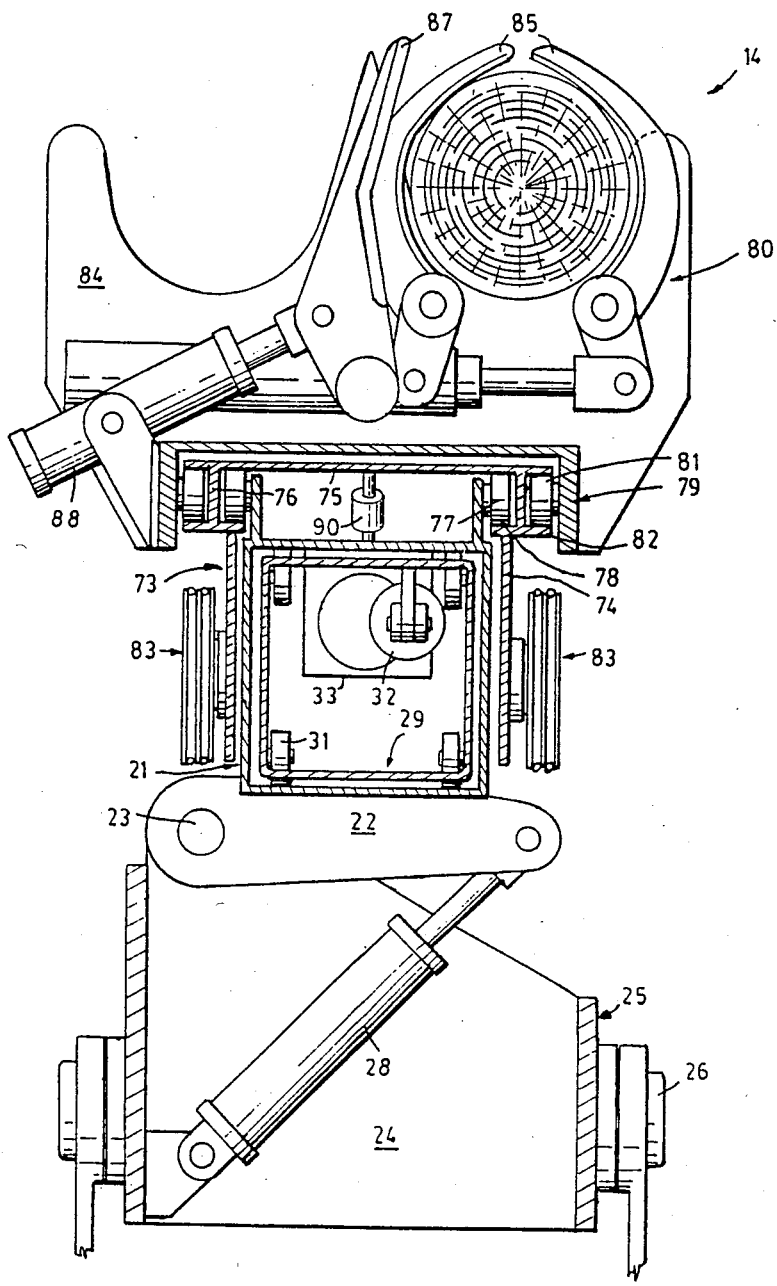
FIG. 8 is a sectional front view of the main boom and the delimbing head taken on line 8—8 on FIG. 7.

As best seen in FIG. 8, delimbing gantry 73 is movably mounted on the main boom 21 and has a pair of side plates 74 (of inverted L-section in end view) connected to a top plate 75 by vertical webs 76. Rollers 77 on the main boom 21 run in the tracks 78 formed along the gantry to support the latter, while the gantry is stabilized by suitable stabilizing rollers (not shown).

A hydraulic ram 90, shown diagrammatically in FIG. 8, is mounted on the main boom 21 and is connected to the gantry 73 so that extension of the ram moves the gantry rearwardly along the boom for a distance of, for example, 1.8 meters.

A delimbing trolley 79, having a double delimbing head 80, is movably mounted on the gantry 73 by rollers 81 running in tracks 82 along the latter. A pulley and cable assembly 83 interconnects the main boom and delimbing trolley to move the latter along the gantry as the gantry moves along the main boom in a similar manner to the method disclosed in my U.S. Pat. No. 4,416,311. Therefore, the movement of the gantry relative to the main boom is multiplied so that the delimbing trolley moves at twice the velocity relative to the boom.

The delimbing head 80 has three spaced base plates 84, the rearward pair of which are provided with opposed delimbing knives 85 operated by a ram 86 (FIG. 2). Docking knives 87, provided with a ram 88, are pivotally mounted on the forward base plate to sever trees up to a diameter of, for example, 10 cm.

The operation of the harvester will now be described.

The secondary boom 29, gantry 73 and delimbing trolley 79 are positioned as shown in FIG. 1; the outer and inner support members 36, 42 raised so that the pivot pin 47 is substantially vertical and the grapple and shear assemblies 15, 16 are opened.

The operator approaches a tree to be harvested until the tree is positioned between the shear arms 61. By operating the rams 41 and/or 46 (and, if necessary, the rams 27 and 28) he tilts the grapple and shear assemblies 15, 16 until the tree trunk lies between the inner grapple arms 50. He operates the ram 55 to cause the grapple arms 50a, 50b to move inwardly until the tree is gripped between the arms.

He extends the ram 72 to cause the shear arms 61 to move inwardly, the shear blades 62 severing the tree trunk adjacent its base. He retracts the rams 72 to open the shear arms and approaches a second tree until the latter lies between the outer grapple 51, the operator having aligned the grapple and shear assemblies with the second tree trunk. He extends ram 56 which moves the outer grapple arms 51, 51b towards each other to grip the tree. In this position, the centres of the trees are aligned.

The operator extends the ram 72 to sever the second tree trunk.

The outer and inner support members 36, 42 are brought to their upright positions and the grapple and shear assemblies 15, 16 are swung through 90° by a ram (not shown) to the position shown in FIG. 5, and then the outer support member 36 is then raised by ram 41 so that the trees rest on the base plates 84 of the delimbing head 79. The delimbing knives 85 are closed around the trees.

Figure 9:
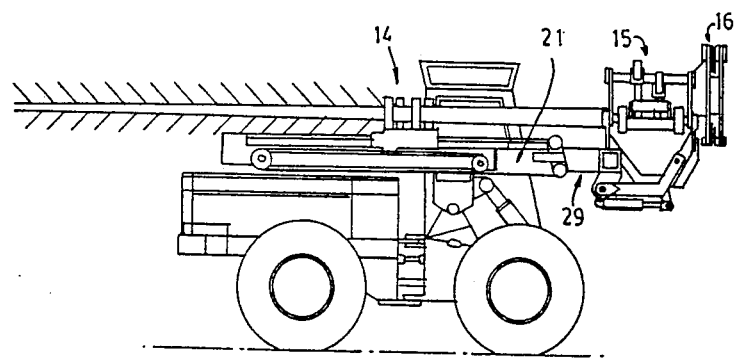
FIGS. 9, 10 and 11 show the steps of the delimbing operation.
Figure 10:
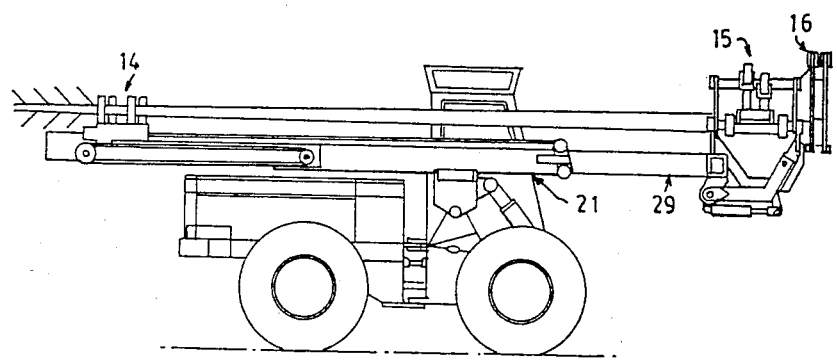
Figure 11:
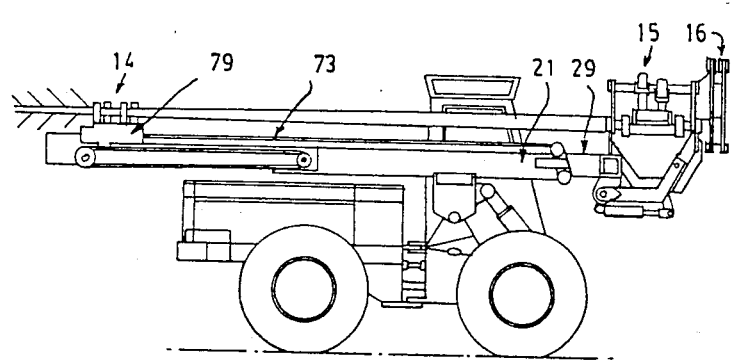

As shown in sequence in FIGS. 9–11, the secondary boom 29 is extended, e.g. 1.2 meters, and the gantry 73 moved rearwardly, e.g. 1.8 meters, simultaneously moving the delimbing trolley 79 along the gantry 73 a distance of 1.8 meters, so that a total length of 4.8 meters of the trees is delimbed.

The grapples and shears are opened and the secondary boom and gantry retracted so that 4.8 meters of delimbed timber is moved past the shear arms 61, the delimbing knives 85 having been clamped about the trees. The shear arms 61 are closed and this length of delimbed timer is docked from the trees.

The grapples and shears are closed and the delimbing knives returned to their delimbing mode and the operation is repeated to delimb and dock successive 4.8 meter lengths from the trees.

When the last useful 4.8 meter section of trees has been delimbed, the operation is modified.

The operator retracts the secondary boom. The distance from the shear blades to the front of the boom is now 1.2 meters, and the distance from the docking knives 87 to the front of the boom is 3.6 meters (the gantry remaining extended and the delimbing trolley at the end of its travel).

The docking knives 87 are closed and the waste timber is docked from the tops of the delimbed trees.

Figure 7:
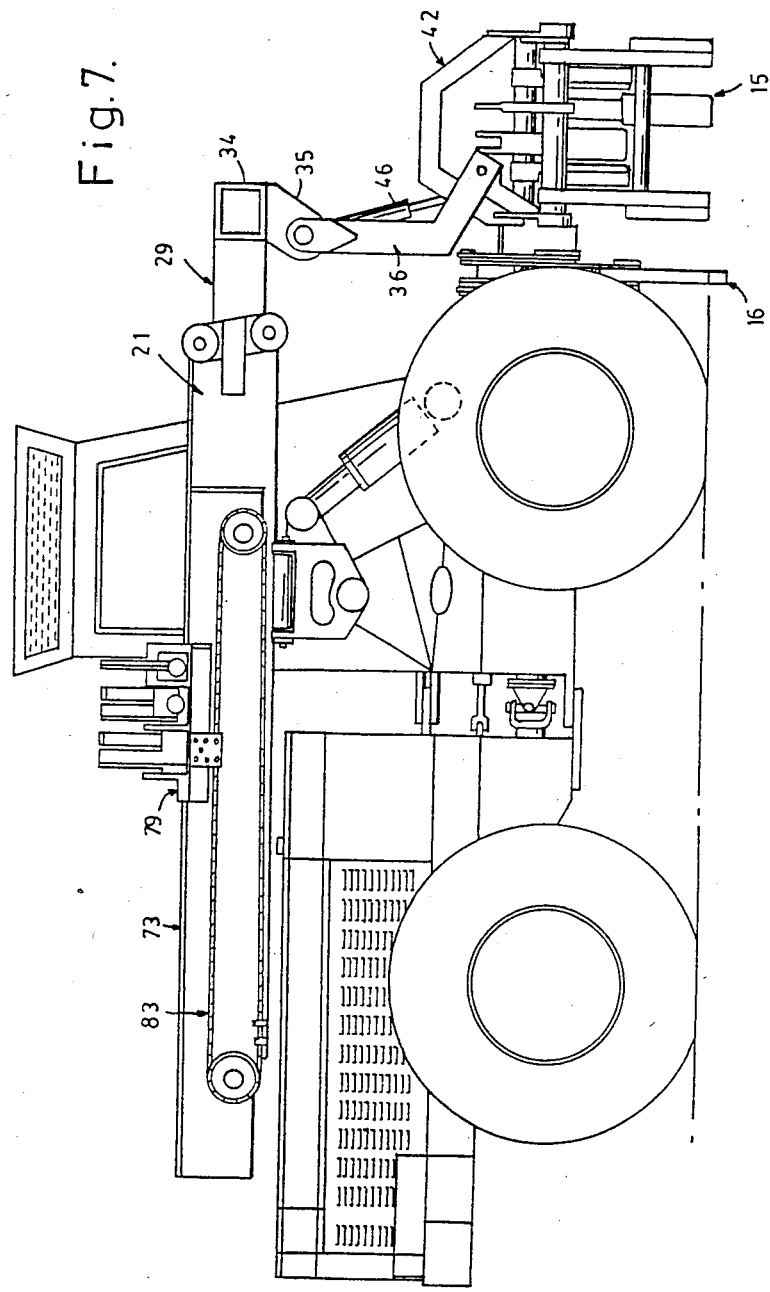
FIG. 7 is a side view of the harvester showing the grapple and shear assemblies in their lowered position to pick up and sever fallen trees or for placing trees on stack.

The delimbing knives 85 are opened, the outer support member 36 is lowered (to the position shown in FIG. 7) and the inner support member 42 swung forwardly (also as shown in FIG. 7) until the trees lie substantially horizontal forwardly of the harvester. The grapples are released and the trees are deposited on a stack.

As the secondary boom can be extended independently of the gantry, the boom may be extended to enable the operator to reach between trees to grip and sever a tree that he could not otherwise reach.

The grapple and shear assemblies can be set to grip and sever trees at almost all attitudes, which is particularly important when harvesting trees lying down or on hillsides.

The operation of the secondary boom, the gantry and the delimbing trolley relative to the main boom enable the whole assembly to be more compact than the boom assembly disclosed in my U.S. Pat. No. 4,416,311 without any reduction in the length of timber which can be delimbed and docked.

It will be readily apparent to the skilled addressee that many changes and modifications may be made to the embodiment described and illustrated without departing from the present invention. For example, the hydraulic controls for the delimbing knives, and the grapple and shear arms may include circuits which ensure that while the delimbing knives grapple the trees, the grapple and shear arms are placed in delimbing mode, and vice versa.

I claim:

1. A tree harvester comprising:
   (a) a fixed main boom mounted on a prime mover, (b) a secondary boom mounted telescopically within said main boom for longitudinal movement relative thereto, and means for longitudinally moving said secondary boom relative to said main boom, (c) grapple and shear assemblies carried by said secondary boom for gripping and severing, respectively, a tree trunk, (d) a delimbing gantry mounted for longitudinal sliding movement on said main boom, and means for moving said gantry relative to said main boom and said secondary boom, (e) a delimbing trolley mounted on said delimbing gantry for longitudinal movement relative thereto, said trolley supporting a delimbing head, and (f) means for simultaneously longitudinally moving said deliming trolley relative to said gantry as said gantry is moved longitudinally relative to said main boom.

2. A tree harvester as claimed in claim 1 wherein said means for moving the secondary boom and the delimbing gantry relative to the main boom include independently operable hydraulic rams on the main boom, and said means to move the delimbing assembly along the delimbing gantry includes a pair of cables, each fixed at one end to the delimbing assembly and at the other end to the main boom, the cables passing around respective pulleys at opposite ends of the delimbing gantry.

3. A tree harvester as claimed in claim 1 wherein said delimbing trolley is mounted on rollers running in tracks on said delimbing gantry and further including a delimbing head on the trolley having a plurality of base plates to support a tree trunk or trunks to be delimbed and a plurality of cooperating delimbing knives operable with the base plates to delimb foliage from the tree trunk or trunks as the delimbing trolley is moved along the delimbing gantry.

4. A tree harvester as claimed in claim 1 wherein said shear assembly includes a shear support frame mounted on the secondary boom, a pair of shear arms each having a shear blade, respective pairs of parallelogram links pivotally mounting each shear arm on the support frame, and actuating means interconnecting a respective link on each shear arm to move the shear blades from an opened position to a closed position to sever a tree, the cutting edges of the shear blades during movement being maintained in a substantially parallel relationship.

5. A tree harvester as claimed in claim 4, wherein one of said pairs of respective links on each shear arm comprise rocker arms pivotally mounted intermediate their length on the shear support frame, each of said shear arms being pivotally mounted at one end thereof to said actuating means, the latter comprising a hydraulic ram.

6. A tree harvester as claimed in claim 1 wherein said grapple assembly is mounted on a grapple support assembly on said secondary boom, said grapple support assembly including a first support member pivotally mounted on the secondary boom, a second support member pivotally mounted on said first support member for movement in a plane substantially along the longitudinal axis of the main boom, said grapple assembly being mounted on the second support member, and means interconnecting said first and second support members and operable to move the second support member to enable the grapple assembly to engage and grip trees between a substantially vertical and a substantially horizontal position.

7. A tree harvester as claimed in claim 6 wherein said first support member is pivotally mounted on said secondary boom for movement in the same plane as said second support member to enable trees gripped by the grapple assembly to be placed on said delimbing assembly for delimbing of unwanted foliage.

8. A tree harvester as claimed in claim 6, wherein said grapple assembly further includes a grapple support pivotally mounted on said second support member to enable the grapple assembly to be swung traversely to the secondary boom, respective first and second pairs of grapple arms pivotally mounted on the grapple support, actuating means to move the pairs of grapple arms pivotally mounted on a common pivotal axis, and the other of each pair of grapple arms is pivotally mounted about a pivotal axis so arranged that in the closed position, the engagement of the grapple arms with the tree trunks gripped by the grapple arms align the tree trunks relative to the secondary boom.

9. A tree harvester as claimed in claim 1 further including a support box pivotally mounted on trunnions on said prime mover transverse to the longitudinal axis of said main boom, and wherein said main boom is pivotally mounted on trunnions on the support box parallel to the longitudinal axis of the main boom, and further including actuating means for pivotally moving said support box and main boom to raise and lower and/or tilt the main boom relative to the prime mover.

* * * * *